United States Patent
Castelaz et al.

(10) Patent No.: US 12,230,983 B1
(45) Date of Patent: Feb. 18, 2025

(54) SMART BATTERY BALANCER FOR BALANCING VOLTAGE OUTPUT LEVELS OF MULTIPLE BATTERIES

(71) Applicant: Motiv Power Systems, Inc., Foster City, CA (US)

(72) Inventors: James Michael Castelaz, Alameda, CA (US); Venkatesh Prasad Hanglur Narasimha, San Mateo, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 749 days.

(21) Appl. No.: 17/507,412

(22) Filed: Oct. 21, 2021

Related U.S. Application Data

(60) Provisional application No. 63/198,466, filed on Oct. 21, 2020.

(51) Int. Cl.
*H02J 7/00* (2006.01)
*H01M 10/42* (2006.01)

(52) U.S. Cl.
CPC ......... *H02J 7/0019* (2013.01); *H01M 10/425* (2013.01); *H02J 7/0024* (2013.01); *H02J 7/0025* (2020.01); *H01M 2010/4271* (2013.01); *H02J 7/0049* (2020.01)

(58) Field of Classification Search
CPC .................................................. H02J 7/0019
USPC .......................................................... 320/103
See application file for complete search history.

(56) References Cited

U.S. PATENT DOCUMENTS

| | | | |
|---|---|---|---|
| 2014/0015474 A1* | 1/2014 | Tsai | G06F 30/20 320/103 |
| 2018/0048165 A1* | 2/2018 | Shiraishi | H01M 10/425 |
| 2019/0115631 A1* | 4/2019 | Taylor, Jr. | H02J 7/00306 |
| 2019/0280488 A1* | 9/2019 | Tang | H01M 10/425 |
| 2020/0185934 A1* | 6/2020 | Zavodny | H02J 7/0019 |

* cited by examiner

*Primary Examiner* — Yalkew Fantu
(74) *Attorney, Agent, or Firm* — Adibi IP Group, PC; Amir V. Adibi; Andrew C. Palmer

(57) ABSTRACT

A smart battery balancer is provided that monitors the voltage output levels of two battery packs and switches current into a selected one of the batteries to maintain balanced voltage output levels. In one embodiment, first and second batteries are connected in series to generate a high voltage output. Current from the batteries is stored in an inductor that is connected to first and second switches. A switch control circuit is configured to generate drive signals to control the first and second switches. The drive signals close the first switch and open the second switch when an output voltage of the first battery is greater than an output voltage of the second battery. The drive signals open the first switch and close the second switch when the output voltage of the second battery is greater than the output voltage of the first battery.

12 Claims, 5 Drawing Sheets

US 12,230,983 B1

SMART BATTERY BALANCER FOR BALANCING VOLTAGE OUTPUT LEVELS OF MULTIPLE BATTERIES

CROSS REFERENCE TO RELATED APPLICATIONS

This application claims the benefit under 35 U.S.C. § 119 from U.S. Provisional Patent Application No. 63/198,466, entitled "Smart Battery Balancer," filed on Oct. 21, 2020, the subject matter of which is expressly incorporated herein by reference.

TECHNICAL FIELD

The present invention relates generally to high voltage circuits, and more specifically, to a smart battery balancer for use with high voltage batteries.

BACKGROUND INFORMATION

High voltage power supplies, such as those used in automotive applications, may utilize multiple batteries connected in series to achieve a desired high voltage output. For example, two batteries having the same voltage output level can be connected in series to produce a high voltage output at twice the level. One problem that may occur in such a configuration is that the output voltage levels of each battery may change during operation. Thus, the battery output levels may become unbalanced, which can adversely affect the batteries or adversely affect the high voltage output.

SUMMARY

A smart battery balancer is provided that monitors the voltage output levels of two battery packs and switches current into a selected one of the batteries to maintain balanced voltage output levels.

In one embodiment, first and second batteries are connected in series to generate a high voltage output. Current from the batteries flows through an inductor that is connected to first and second switches. A switch control circuit is configured to generate drive signals to control the first and second switches. The drive signals close the first switch and open the second switch when an output voltage of the first battery is greater than an output voltage of the second battery. This causes current to flow from the first battery, through the inductor and return to the first battery. The drive signals then open the first switch and close the second switch which causes the current in the inductor to flow through the second battery and thereby transfer energy from the first battery to the second battery using the inductor to maintain balanced output levels. The drive signals open both switches to discontinue the energy transfer process. The drive signals open the first switch and close the second switch when the output voltage of the second battery is greater than the output voltage of the first battery. This causes current to flow from the second battery, through the inductor and return to the second battery. The drive signals then open the second switch and close the first switch which causes current in the inductor to flow through the first battery and thereby transfer energy from the second battery to the first battery to maintain balanced output levels.

In another embodiment, an apparatus is provided that comprises first and second batteries connected in series to generate a high voltage output. A negative terminal of the first battery and a positive terminal of the second battery are connected to a midpoint terminal. The apparatus also comprises an inductor having a first terminal connected to the midpoint terminal, a first switch connected between a positive terminal of the first battery and a second terminal of the inductor, and a second switch connected between a negative terminal of the second battery and the second terminal of the inductor. The apparatus also comprises a switch control circuit configured to generate drive signals that control the first and second switches to cause power flow from the first battery through the inductor to the second battery when an output voltage of the first battery is higher than an output voltage of the second battery voltage, and to cause power flow from the second battery through the inductor to the first battery when the output voltage of the second battery is higher than an output voltage of the first battery.

In yet another embodiment, a method is provided that comprises generating a high voltage output from first and second batteries connected in series and comparing a first output signal indicative of the first battery state-of-charge to a second output signal indicative of the second battery state-of-charge. The method also comprises directing current from the first battery to the second battery when the first output signal is greater than the second output signal, and directing current from the second battery to the first battery when the second output signal is greater than the first output signal.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
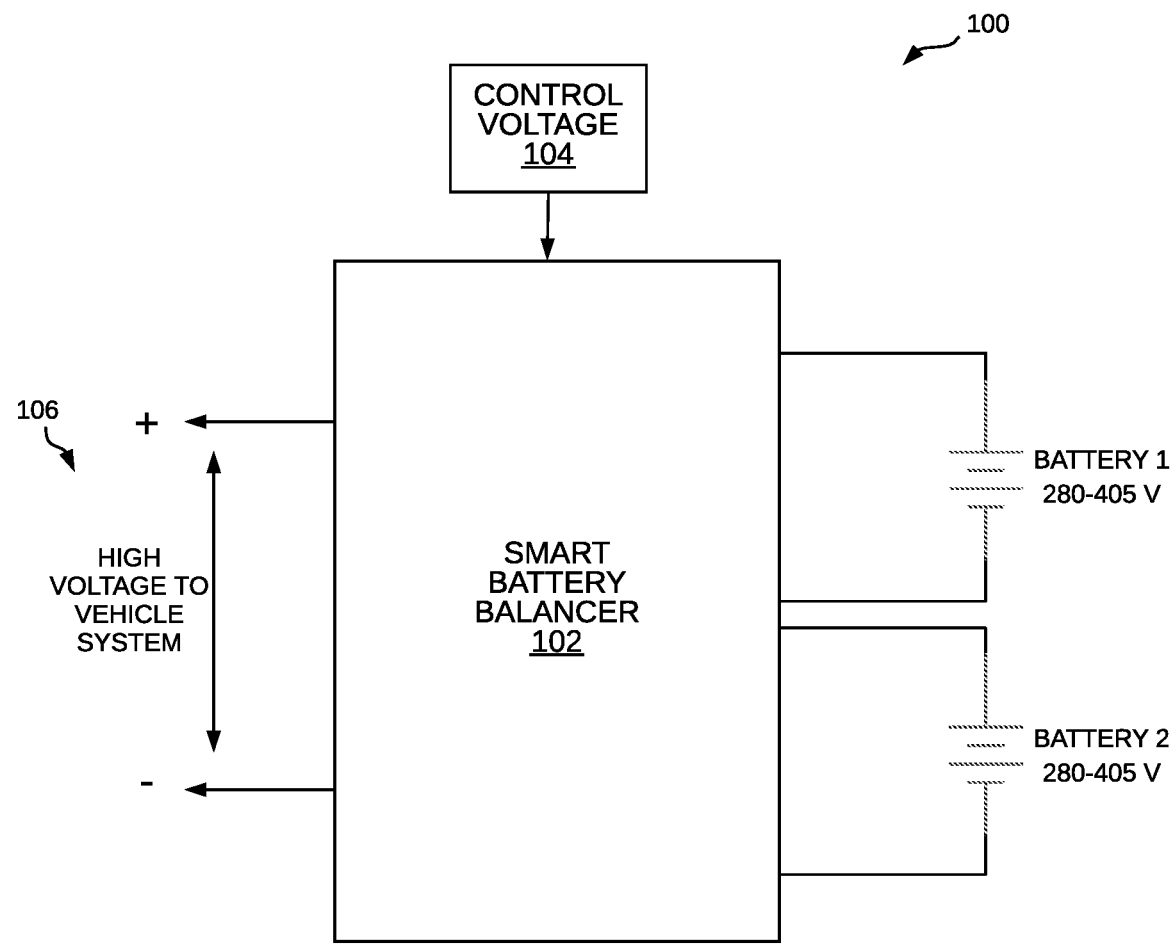
FIG. 1 is a diagram showing an overview of a smart battery balancer for use in a high voltage battery application.

FIG. 1 is a diagram 100 showing an overview of a smart battery balancer 102 for use in high voltage battery applications. As illustrated in FIG. 1, a first battery and a second battery are connected to the smart battery balancer 102. The first and second batteries are combined to generate a high voltage output 106 to a vehicle system. A control voltage 104 is used to enable and disable the battery balancer 102. During operation, the battery balancer 102 operates to balance the output voltages of the batteries. For example, in one embodiment, the balancer 102 stores energy and directs this energy to either the first or second battery when one of the battery's output voltage begins to drop relative to the other battery. Thus, the balancer 102 is able to maintain the battery voltage levels relatively balanced during use to provide the high voltage output.

Figure 2A:
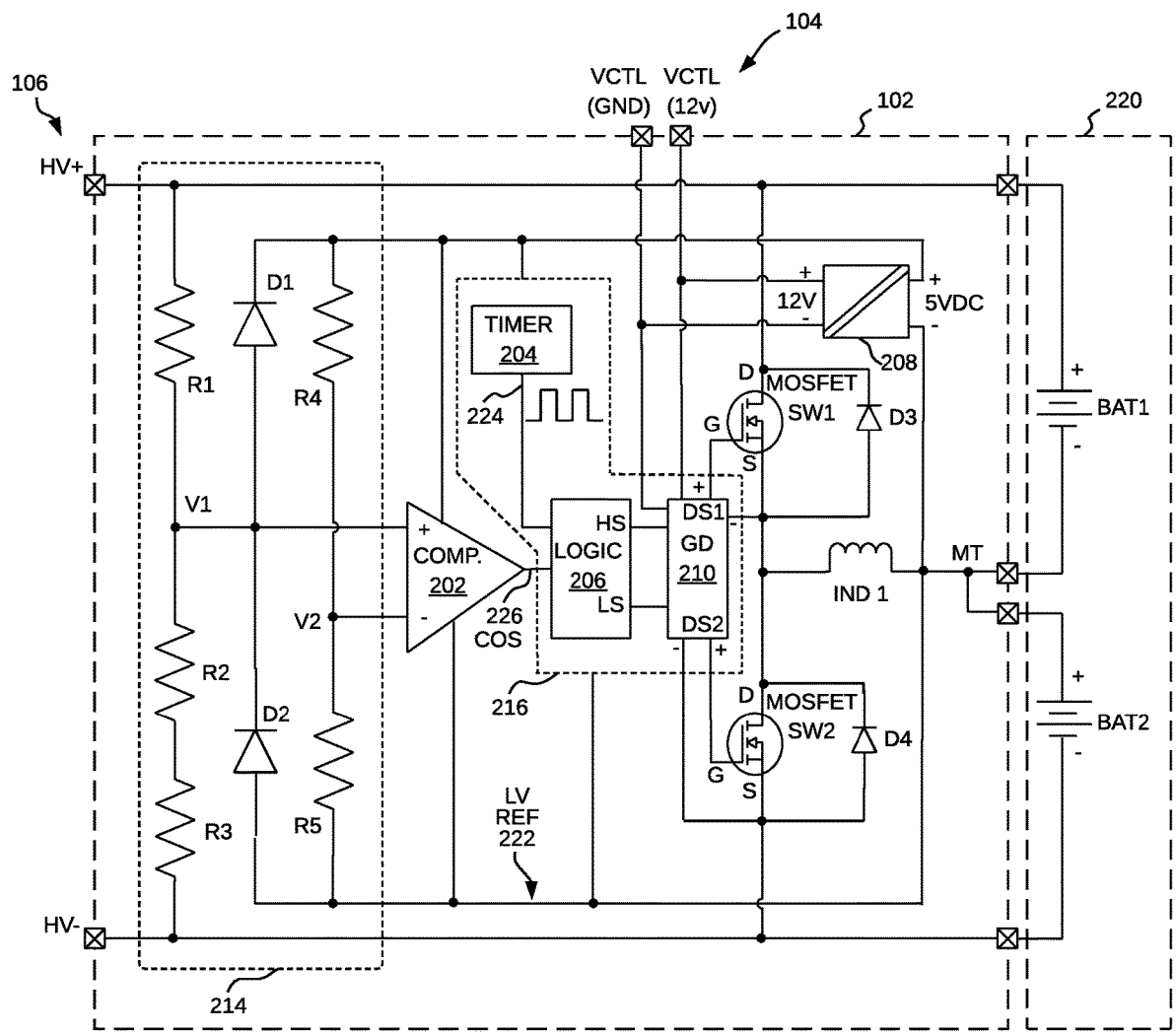
FIG. 2A is a diagram showing a detailed exemplary embodiment of the smart battery balancer shown in FIG. 1.

FIG. 2A is a diagram showing a detailed exemplary embodiment of the smart battery balancer 102 shown in FIG. 1. In the embodiment of FIG. 2A, the smart battery balancer 102 comprises a bias circuit 214, a comparator 202, a switch control circuit 216, and a DC-to-DC converter 208 that generates a 5 volt DC (5 VDC) low voltage power source. The balancer 102 also comprises first and second MOSFET switches SW1 and SW2, diodes D3 and D4, and an inductor IND 1.

The bias circuit 214 comprises resistors R1, R2, and R3 that are used to generate a first bias voltage V1. The bias circuit 214 also comprises resistors R4 and R5 that are used to generate a second bias voltage V2. The bias circuit 214 also comprises protection diodes D1 and D2. The resistors R1, R2, and R3 form a voltage divider that is connected across the high voltage output terminals 106. The resistors R4 and R5 form a voltage divider that is connected across the 5 VDC source. In one example, the resistors have resistance values of: R1=10M, R2=57 ohm, R3=10M, R4=200k, and R5=50k. The first bias voltage V1 will be greater than the second bias voltage V2 when the voltage across BAT1 is greater than the voltage across BAT2, which will occur when the energy stored in BAT1 is greater than the energy stored in BAT2 provided that the batteries have the same impedance and the same current flowing through them.

In one embodiment, the switch control circuit 216 comprises a timer 204, a logic circuit 206, and a gate driver circuit 210. The 5 VDC source, supplied from the power and ground output connections of the DC-to-DC converter 208, is connected to the switch control circuit 216 and internally connected to the power and grounds of timer 204, logic 206, and gate driver circuit 210. The grounds of the 5 VDC source, timer 204, logic 206, and gate driver circuit 210 together form the low voltage reference 222. The timer 204 outputs a timer signal 224 that is input to the logic circuit 206. In one embodiment, the timer 204 comprises a "555" timer integrated circuit that is configured to output a square wave of approximately 500 kHz with a duty cycle of approximately 65%. Because the timer 204 outputs a duty cycle over 50%, the gate driver circuit 210 operates the switches SW1 and SW2 such that the inductor IND 1 operates in discontinuous conduction mode. Maintaining the inductor IND 1 in discontinuous conduction mode allows for open-loop control of the gate driver circuit 210 using inputs from only the comparator 202 and timer 204 output signals. The comparator 202 compares the bias voltages V1 and V2 to generate a comparator output signal 226 that also is input to the logic circuit 206. The logic circuit generates high side (HS) and low side (LS) switch signals that are input to the gate driver 210. The gate driver 210 generates a first drive signal (DS1) and a second drive signal (DS2) that are complementary and connected to gate terminals of the first (SW1) and second (SW2) switches. The gate drive signals DS1 and DS2 are referenced to respectives switch SW1 and SW2 source terminals. In another embodiment, the gate driver 210 comprises an isolated gate driver, such as a "Si823Hx" integrated circuit.

A battery circuit 220 comprises a first battery BAT1 having a positive terminal connected to a positive terminal of the high voltage output 106. The first battery BAT1 also has a negative terminal connected to a positive terminal of a second battery BAT2 at a midpoint terminal MT. The second battery BAT2 has a negative terminal that is connected to a negative terminal of the high voltage output 106.

The midpoint terminal MT between the batteries is connected to a first terminal of the inductor IND 1. The terminal MT is also connected to a negative terminal of the 5 VDC source, which is a low voltage reference 222. A second terminal of the IND 1 is connected to the two MOSFET switches SW1 and SW2.

A drain terminal of SW1 is connected to the positive terminal of the high voltage output 106. A source terminal of SW1 is connected to a second terminal of the IND 1. A source terminal of SW2 is connected to the negative terminal of the high voltage output 106. A drain terminal of SW2 is connected to the second terminal of the IND 1. The diodes D3 and D4 are connected across the first (SW1) and second (SW2) switches, respectively. In an alternative embodiment, Insulated Gate Bipolar Transistors (IGBTs) are used instead of MOSFET switches with their collectors connected as the MOSFET drains are connected and their emitters connected as the MOSFET sources are connected.

During operation, when the voltage control input 104 (e.g., 12V) is applied, three power rails will become powered and the battery balancer 102 will begin functioning as an open-loop buck converter that moves energy from the higher-voltage battery into the lower-voltage battery by way of the inductor IND 1.

The three power rails comprises three isolated DC power supplies, namely, the 5 VDC source that powers the low voltage circuits and two power supplies for the isolated gate driver 210 outputs DS1 and DS2—one 12V supply referenced to each MOSFET source. All three isolated power supplies are supplied by the voltage control input 104. In an alternative embodiment, the 5 VDC source may be 12V and may be used to power the isolated gate driver 210 output DS2. In another alternative embodiment, the DC-DC converter 208 may be used in combination with a bootstrap circuit to power the isolated gate driver 210 output DS1.

After the balancer 102 is activated, if the bias voltage V1 input to the comparator 202 is larger than the bias voltage V2, this means BAT1 has a higher output voltage than BAT2. In this case, the switch SW1 is turned on at a 35% duty cycle. This allows current to flow from BAT1 through the inductor IND 1 and back to BAT1. Both SW1 and SW2 are turned off for the remaining 65% of the duty cycle and diode D4 conducts the inductor IND 1 current through BAT2 until the inductor IND 1 current drops to zero (e.g., discontinuous conduction). Thus, the comparator output 226 will be +5V when V1 is higher than V2, and it is during this time that SW1 is closed based on the timer output signal 224. To achieve this, the timer output signal 224 and the comparator output signal 226 are combined to enable the high side (HS) switch signal and DS1 drive signal to close SW1 (after isolation).

If the bias voltage V2 input to the comparator 202 is larger than the bias voltage V1, this means that the output voltage of BAT2 is higher than the output voltage of BAT1. In this case, the timer output signal 224 and the comparator output signal 226 are combined to enable the low side (LS) switch signal and DS2 drive signal to close SW2 (after isolation).

If, during operation, the output voltages of the battery packs are very close to each other, then the control voltage 104 can be removed to turn off the balancer to conserve energy.

Figure 2B:
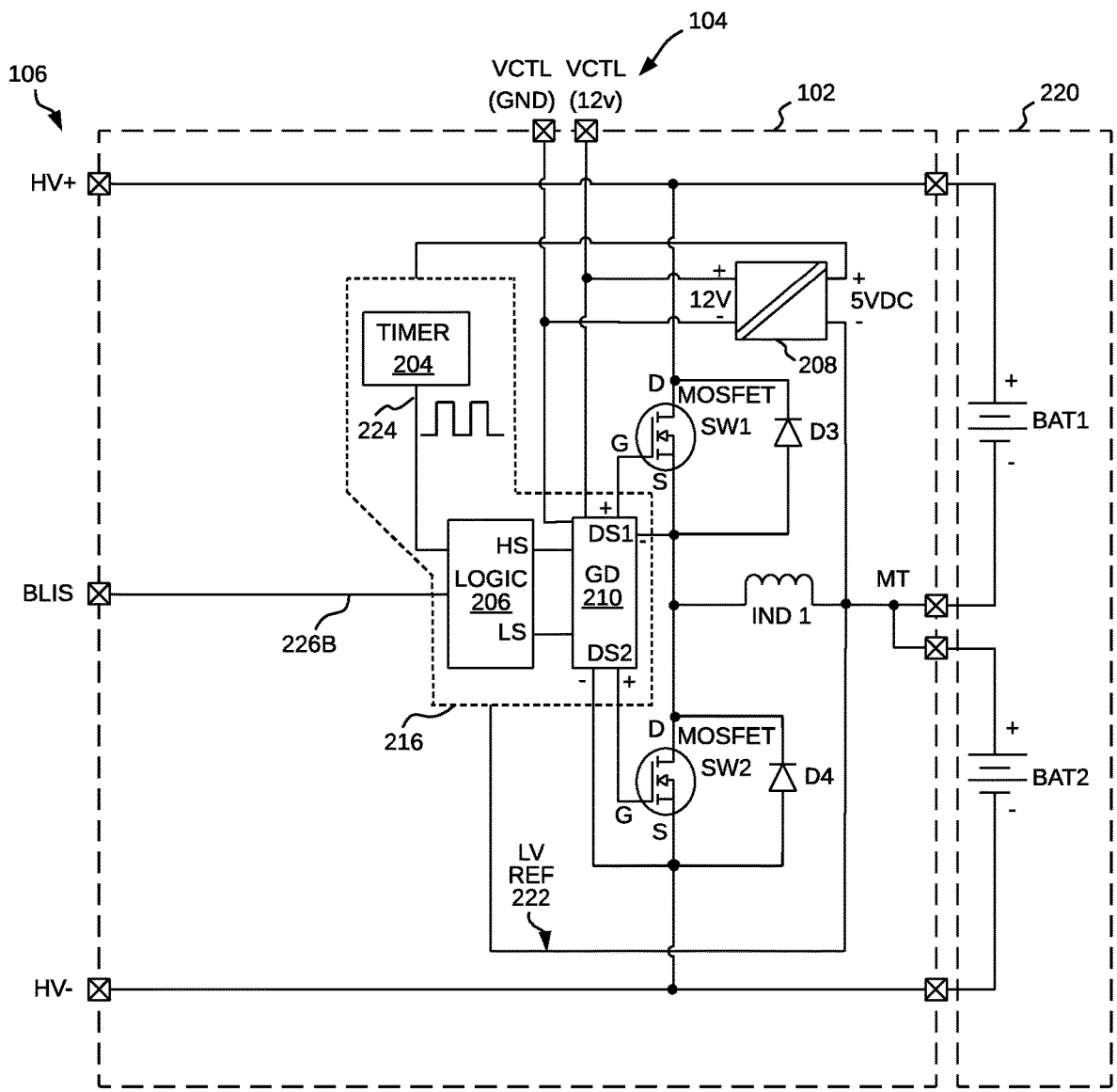
FIG. 2B is a diagram showing a detailed alternative exemplary embodiment of the smart battery balancer shown in FIG. 1.

FIG. 2B is a detailed alternative embodiment of the balancer circuit 102 in which the bias circuit 214 and comparator 202 are replaced with a balance logic input signal (BLIS) 226B that is input to the battery balancer 102. The balance logic input signal 226B is provided in place of the comparator output signal 226 as input into the logic 206. In an embodiment, the balance logic input signal 226B is controlled by a controller, which communicates with a battery management system connected to BAT1 and BAT2. The controller sets the BLIS 226B signal to high (5V) level when the controller determines that the state of charge of BAT1 is greater than the state of charge of BAT2 and the controller sets the BLIS 226B signal to low (0V) otherwise. Furthermore, the BLIS 226B can be referenced to the same ground point as the MT terminal or may require isolation if it is referenced to another voltage.

Figure 3:
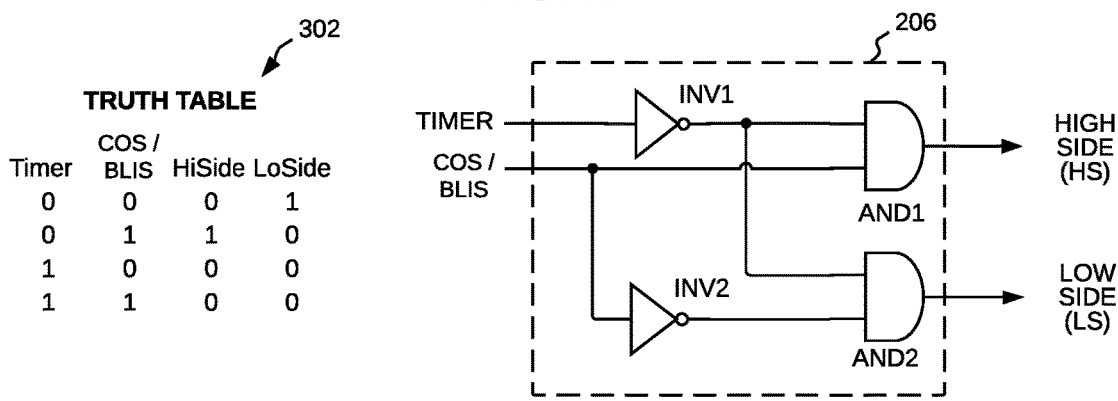
FIG. 3 is a diagram showing a detailed exemplary embodiment of logic used in the smart battery balancer shown in FIGS. 2A and 2B.

FIG. 3 is a detailed exemplary embodiment of the logic circuit 206 used in the smart battery balancer 102 shown in FIGS. 2A and 2B. In an embodiment, the logic circuit 206 comprises first and second inverters INV1 and INV2 and first and second "AND" gates AND1 and AND2. The logic circuit 206 receives the timer output signal 224 and the comparator output signal 226 and generates high-side and low-side switch signals to the gate driver 210, which enables the drive signals DS1 and DS2, accordingly. In another embodiment, the logic circuit 206 receives the BLIS 226B instead of the comparator output signal (COS) 226. In one embodiment, the logic circuit 206 implements the truth table 302 as shown in FIG. 3.

Figure 4:
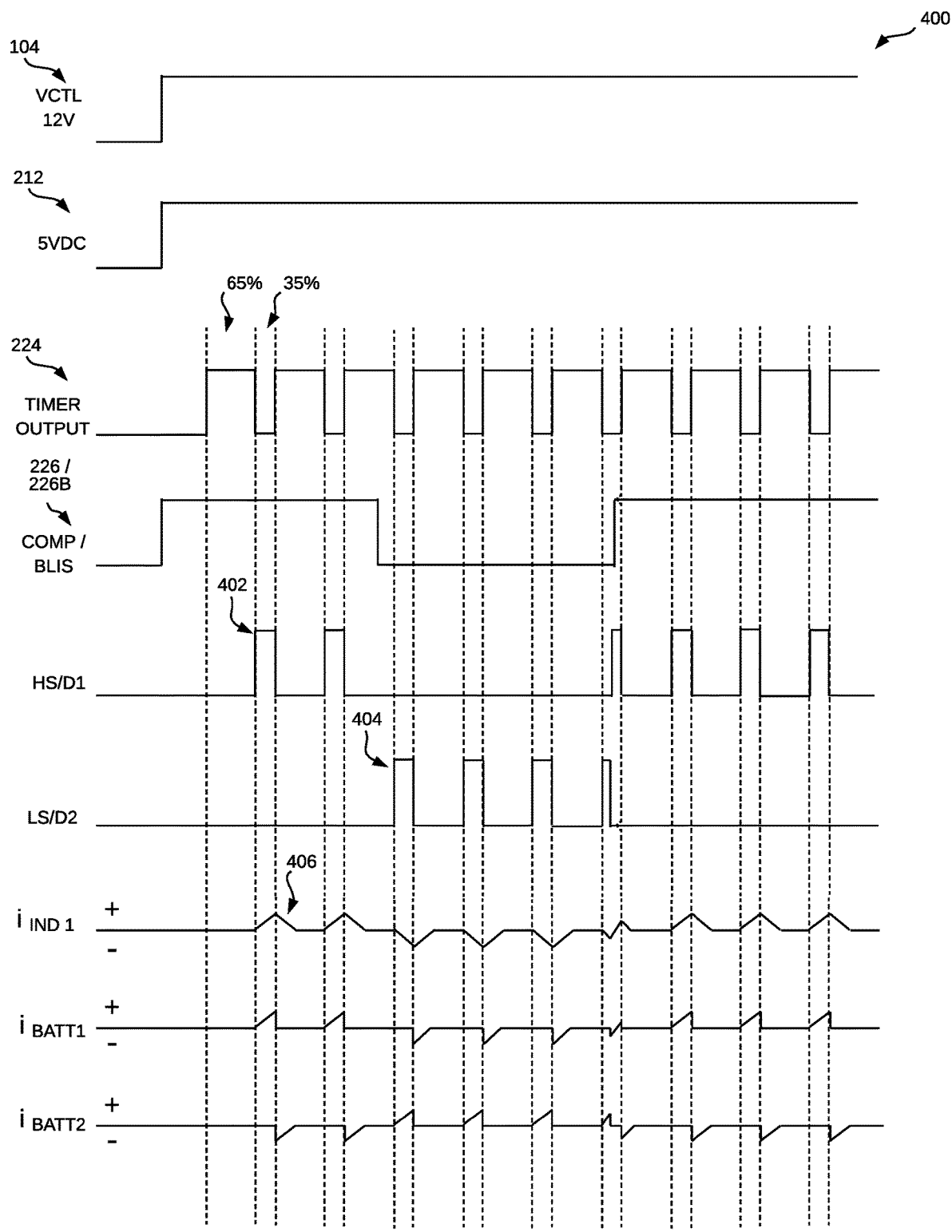
FIG. 4 is a diagram showing a timeline of signals generated during operation of the smart battery balancer shown in FIGS. 2A and 2B.

FIG. 4 is a diagram showing a timeline of signals generated during operation of the smart battery balancer 102 shown in FIGS. 2A and 2B. As illustrated in FIG. 4, the voltage control signal (VCTL) 104 is set to 12 volts to activate the battery balancer. In response to the voltage control signal, the 5 VDC source is turned on to generate 5 volts DC to the circuit. The timer 204 begins to output the timer output signal 224 when the 5 VDC source is turned on. The timer output signal 224 is a square wave with a frequency of approximately 500 kilohertz and a duty cycle of approximately 65%.

As illustrated in FIG. 2A, the logic circuit 206 receives the timer output signal 224 and the comparator output signal 226 to generate the high-side (HS) and low-side (LS) switch signals. As illustrated in FIG. 2B, the logic circuit 206 receives the timer output signal 224 and the BLIS 226B to generate the high-side (HS) and low-side (LS) switch signals. These signals are received by the gate driver 210 that generates corresponding drive signals DS1 and DS2. For example, when the timer output 224 is low and the comparator output 226 is high, the LS/DS2 signal is activated as shown at 404. When the timer output 224 is low and the comparator output 226 is high, the HS/DS1 signal is activated as shown at 402. It should be noted that the drive signals are active during the time interval when the timer output 224 is at the logic low level.

Also shown in FIG. 4 are the IND 1 current ($i_{IND1}$), the battery 1 current ($i_{BATT1}$) and the battery 2 current ($i_{BATT2}$). With respect to the IND 1 current, a positive (+) current indicates current flow through the IND 1 from left to right towards the battery midpoint terminal (MT). A negative (−) current indicates current flow through the IND 1 from right to left away from the battery midpoint terminal (MT). With respect to the battery currents, a positive (+) current indicates current flow out of a battery positive terminal and a negative (−) current indicates current flow into a battery positive terminal. It should also be noted that the slope of the lines representing increasing and decreasing current, such as the slope of line 406, are similar for both positive and negative slopes, since the magnitude of the voltage across IND 1 is roughly equal to the voltage of BAT1 or BAT2, which are similar. Because many batteries have a voltage that does not vary substantially across their state of charge, a timer 224 with an output that is a constant duty cycle as shown in FIG. 4 may be employed. In alternative embodiments, the duty cycle of the output of timer 224 may vary as battery voltage varies.

Figure 5:
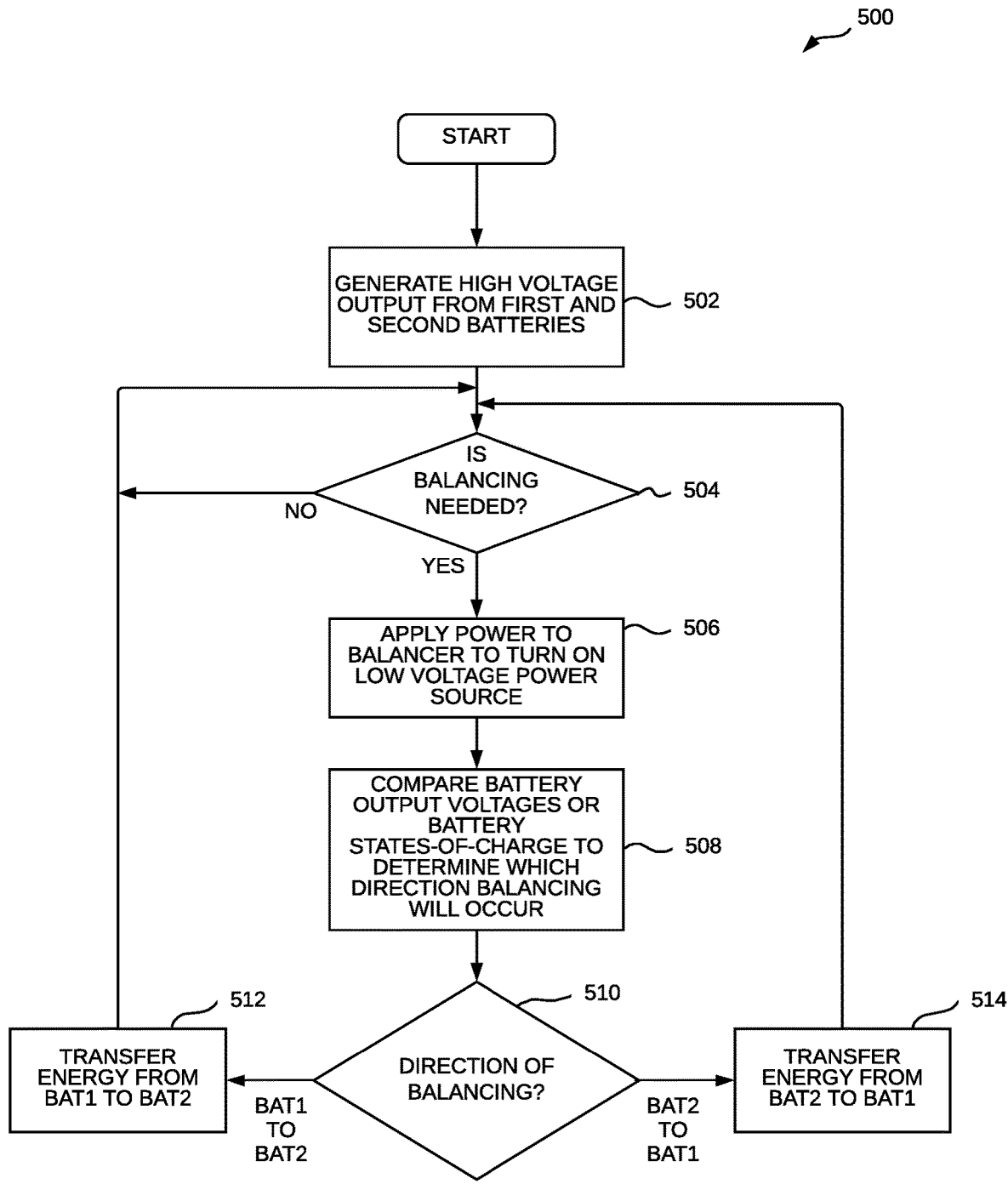
FIG. 5 is a diagram showing a method for performing smart battery balancing.

FIG. 5 is a diagram showing a method 500 for performing smart battery balancing. For example, the method 500 is suitable for use with smart battery balancer 102 shown in FIG. 1.

At block 502, a high voltage output is generated by first and second battery packs. For example, the first battery BAT1 and the second battery BAT2 are connected in series to generate high voltage power across the high voltage terminals 106.

At block 504, determine if balancing is needed. If not, the method returns to block 504 to re-evaluate. If balancing is needed, the method proceeds to block 506. Balancing may be needed if the voltages or states of charge of the two batteries vary.

At block 506, power is applied to the balancer circuit to turn on a low voltage power source. For example, the control voltage 104 is applied to the battery balancer 102 to turn on the dc-to-dc converter 208. The isolated output of the DC-to-DC converter 208 provides a 5 VDC source that provides 5 volts to the logic circuits of the smart battery balancer.

At block 508, battery output voltages are compared. For example, the bias circuit 214 generates the bias voltage V1 from the output of the batteries and the bias voltage V2 from the output of the 5 volt supply. The comparator 202 compares the bias voltages V1 and V2 to generate the comparator output signal 226, which indicates whether the output of BAT1 is higher or lower than the output of BAT2.

In an alternative embodiment, communications from the battery management systems of BAT1 and BAT2 are compared to determine which battery has the higher state-of-charge (SOC). Balancing is applied from the battery with the higher SOC to the battery with the lower Soc.

At block 510, a determination is made as to which direction balancing will occur. If balancing will occur from BAT1 to BAT2, then the method proceeds to block 512. If balancing will occur from BAT2 to BAT1, then the method proceeds to block 514.

At block 512, energy is transferred from BAT1 to BAT2. For example, the comparator 202 determines that the bias voltage V1 is greater than the voltage V2 and generates the comparator output signal 226 to be at a high level. The logic 206 receives the timer output signal 224 and the comparator output signal 226 and generates the HS and LS signals according to the truth table 302. For example, when the comparator output 226 is high and the timer output 224 is low, the HS/DS1 signals are driven to a high state and the LS/DS2 signals are driven to a low state. This configuration turns on SW1 and turns off SW2 so that current flowing through BAT1 and the IND 1 is switched to flow through the IND land BAT2. The method then proceeds to block 504.

At block 514, energy is transferred from BAT2 to BAT1. For example, the comparator 202 determines that the bias voltage V1 is less than the voltage V2 and generates the comparator output signal 226 to be at a low level. The logic 206 receives the timer output signal 224 and the comparator output signal 226 and generates the HS and LS signals according to the truth table 302. For example, when the comparator output 226 is low and the timer output 224 is low, the HS/DS1 signals are driven to a low state and the LS/DS2 signals are driven to a high state. This configuration turns on SW2 and turns off SW1 so that current flowing through BAT2 and the IND 1 is switched to flow through the IND 1 and BAT1. The method then proceeds to block 504.

Thus, the method 500 operates to perform smart battery balancing. It should be noted that the operations described are exemplary and not limiting of the embodiments. Also, the operations described may be re-arranged, modified, deleted, added to, or otherwise changed within the scope of the embodiments.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus comprising:
    first and second batteries connected in series to generate a high voltage output, wherein a negative terminal of the first battery and a positive terminal of the second battery are connected to a midpoint terminal;
    an inductor having a first terminal connected to the midpoint terminal;
    a first switch connected between a positive terminal of the first battery and a second terminal of the inductor;
    a second switch connected between a negative terminal of the second battery and the second terminal of the inductor; and
    a switch control circuit configured to generate drive signals that control the first and second switches to cause power flow from the first battery through the inductor to the second battery when energy in the first battery is higher than energy in the second battery, and to cause power flow from the second battery through the inductor to the first battery when energy in the second battery is higher than energy in the first battery, wherein the switch control circuit comprises an isolated gate drive circuit that generates the first and second drive signals from high side and low side switch control signals, respectively, and wherein the first and second drive signals are connected to control the first and second switches, respectively.

2. The apparatus of claim 1, further comprising logic that generates the high side and low side switch signals from a timer output signal and a comparator output signal.

3. The apparatus of claim 2, further comprising a timer that generates the timer output signal.

4. The apparatus of claim 3, wherein the timer generates the output signal to comprise a frequency of approximately 500 kHz and a duty cycle of approximately 65 percent.

5. The apparatus of claim 2, further comprising a comparator that generates the comparator output signal from first and second bias signals.

6. The apparatus of claim 5, further comprising a resistor network that generates the first bias signal from the high voltage output, wherein the first bias signal is input to a positive terminal of the comparator.

7. The apparatus of claim 5, further comprising a resistor network that generates the second bias signal referenced to the midpoint terminal, wherein the second bias signal is input to a negative terminal of the comparator.

8. The apparatus of claim 1, further comprising logic that generates the high side and low side switch signals from a timer output signal and a balance logic input signal.

9. A method comprising:
    generating a high voltage output from first and second batteries connected in series;
    comparing a first output signal indicative of the first battery state-of-charge to a second output signal indicative of the second battery state-of-charge;
    directing current from the first battery to the second battery when the first output signal is greater than the second output signal, wherein the operation of directing comprises switching the current to the second battery using first and second switches, and wherein the operation of switching comprises generating first and second drive signals from high side and low side switch signals, respectively, wherein the first and second drive signals are connected to control the first and second switches, respectively; and
    directing current from the second battery to the first battery when the second output signal is greater than the first output signal, wherein the operation of directing comprises switching the current to the first battery using first and second switches, wherein the operation of switching comprises generating first and second drive signals from high side and low side switch signals, respectively, and wherein the first and second drive signals are connected to control the first and second switches, respectively.

10. The method of claim 9, further comprising generating the high side and low side switch signals from a timer output signal and one of a comparator output signal (COS) and a battery logic input signal (BLIS).

11. The method of claim 10, further comprising generating the timer output signal to comprise a frequency of approximately 500 kHz and a duty cycle of approximately 65 percent.

12. The method of claim 9, further comprising:
    generating first and second bias voltages; and
    comparing the first and second bias voltages to generate the comparator output signal.

* * * * *